(No Model.)

E. F. DUNCAN.
ROTATING SULKY HARROW.

No. 356,032. Patented Jan. 11, 1887.

Witnesses
C. E. Doyle
J. W. Garner

Inventor
E. F. Duncan
By his Attorneys

UNITED STATES PATENT OFFICE.

EMORY F. DUNCAN, OF JASPER, MISSOURI.

ROTATING SULKY-HARROW.

SPECIFICATION forming part of Letters Patent No. 356,032, dated January 11, 1887.

Application filed September 22, 1886. Serial No. 214,267. (No model.)

*To all whom it may concern:*

Be it known that I, EMORY F. DUNCAN, a citizen of the United States, residing at Jasper, in the county of Jasper and State of Missouri, have invented a new and useful Improvement in Rotating Sulky-Harrows, of which the following is a specification.

My invention relates to an improvement in rotating sulky-harrows; and it consists in the peculiar construction and combination of devices, that will be more fully set forth hereinafter, and particularly pointed out in the claims.

Figure 1:
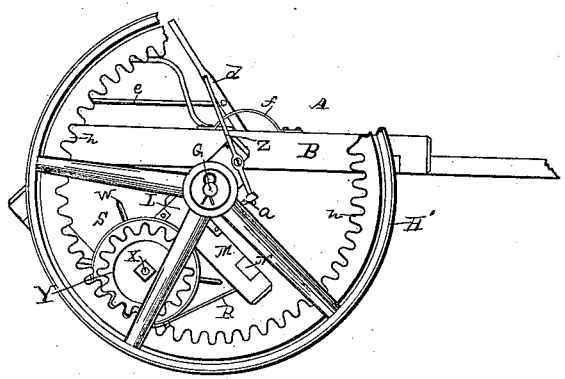
Figure 2:
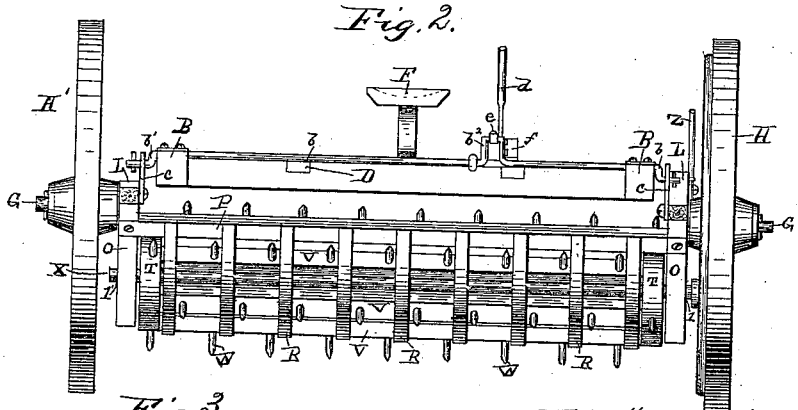
Figures 3, 4:
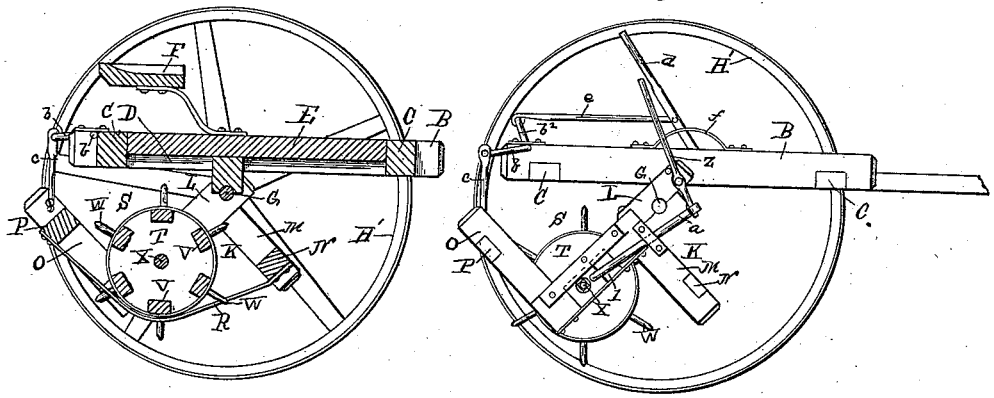

In the drawings, Figure 1 is a side elevation of a rotating sulky-harrow embodying my improvements. Fig. 2 is a rear elevation of the same. Fig. 3 is a vertical longitudinal sectional view. Fig. 4 is an elevation with the rear supporting-wheel and the gear-wheel Y removed.

A represents the sulky-frame, which is rectangular and comprises the side beams, B, the transverse end beams, C, and the beams D, which extend parallel with the side beams and have their ends connected to the end beams. Between the said beams B is a platform, E, of suitable dimensions, and on the said platform is secured a supporting-arm which carries the driver's seat F.

G represents the axle, which is secured under the sulky-frame, and on the spindles of the said axle are mounted the wheels H and H', which are of the same diameter.

I represents the tongue, to which the draft-animals are attached. The wheel H is provided near its rim with spur-teeth $h$.

K represents a harrow-frame, which comprises arms L, that extend downwardly and rearwardly and have their upper ends hinged or pivoted on the spindles of the axle at the inner ends of the hubs of the wheels. From the lower sides of the said arms L depend supporting-arms M, which are arranged near the front ends of the arms L and at right angles thereto, and the said arms M are connected near their lower ends by a transverse bar, N.

To the rear ends of the hinged arms L of the harrow-frame are attached upwardly-extending supporting-arms O, which are arranged at right angles to the arms L, and the said arms O are connected near their upper ends by a transverse bar, P.

R represents a series of curved straps, which are arranged at suitable regular distances apart and have their lower front ends attached to the bar N and their rear upper ends attached to the bar P. Near the lower end of one of the arms L of the harrow-frame is made a longitudinal slot, $l$, and in the opposite arm L is made a transverse opening, $l'$.

S represents a rotating cylindrical harrow comprising the circular heads T, the transverse connecting-bars V, which have their extremities attached to the said circular heads, and the harrow-teeth W, which are secured to the bars D and project outwardly therefrom. These harrow-teeth are arranged out of line with each other, and are thereby caused to thoroughly stir and pulverize the soil.

X represents a shaft, which extends centrally through the heads of the harrow, the said shaft being journaled in the opening $l'$ and the slot $l$ of the arm L. On one end of the said shaft is rigidly secured a pinion, Y, which is adapted to mesh with the teeth $h$ of the wheel H.

Z represents a hand-lever, which is fulcrumed to the upper end of one of the hinged arms L, and the said hand-lever has its lower end connected to the block in which one end of the shaft X is journaled, and which is free to slide in the slot $l$ by means of a rod, $a$.

$b$ represents a transverse rock-shaft, which is journaled in bearing-blocks on the rear side of the sulky-frame. The said rock-shaft is provided at its extremities with arms $b'$, and near its center with a crank-arm, $b^2$. The arms $b'$ are connected to the harrow-frame by means of rods $c$.

$d$ represents a hand-lever, which is pivoted to one of the beams D of the sulky-frame, and the said lever is connected to the crank-arm of the rock-shaft by means of a rod, $e$.

$f$ represents a segment, which is bolted to the sulky-frame and is provided with notches adapted to engage the hand-lever $d$ and retain the same in any desired position.

From the foregoing it will be readily understood that the harrow-frame carrying the rotating harrow may be raised from the ground or lowered thereto by moving the hand-lever $b$, and it will be also understood that the end of the shaft of the harrow which is journaled in the slot $l$ may be moved in the said slot by means of the hand-lever Z, so as to cause the pinion of the rotating harrow to either engage the teeth of the wheel H or to be disengaged therefrom.

The operation of my invention will be readily understood. Upon starting across the field the harrow-frame is first lowered to the ground and the lever Z is then moved so as to cause the free end of the rotating harrow-shaft to be lowered in the slot $l$, and thereby throw the pinion of the said rotating harrow into engagement with the teeth of the wheel H. The rotation of the said wheel, as the harrow advances, is communicated to the rotating harrow, and the latter is revolved at considerable speed. The teeth of the harrow pass between the curved straps of the harrow-frame, and the function of the said straps is to prevent the machine from becoming clogged with rubbish.

Having thus described my invention, I claim—

1. The combination of the sulky-frame having the supporting-wheels, the frame K, depending from the sulky-frame and pivoted to the axle on which the supporting-wheels turn, the said frame K having the straps R on its lower side, the rotating harrow journaled in the frame K, having the teeth projecting between the straps and geared to one of the supporting-wheels, and the lever $d$, to raise and lower the frame K, for the purpose set forth, substantially as described.

2. The combination of the sulky having the supporting-wheels, one of which has the gear-teeth $h$, the frame K on the under side of the sulky, the rotating harrow journaled in the said frame, one end of the harrow being movable therein and having the pinion Y, to engage the teeth $h$, for the purpose set forth, and the lever Z, to move the said end of the harrow to disengage the pinion from the teeth $h$, substantially as described.

In testimony that I claim the foregoing as my own I have hereto affixed my signature in presence of two witnesses.

EMORY F. DUNCAN.

Witnesses:
H. HENDRICKS,
C. R. RICE.